United States Patent
Zafred et al.

(10) Patent No.: US 8,163,433 B2
(45) Date of Patent: Apr. 24, 2012

(54) FUEL CELL INTEGRAL BUNDLE ASSEMBLY INCLUDING CERAMIC OPEN END SEAL AND VERTICAL AND HORIZONTAL THERMAL EXPANSION CONTROL

(75) Inventors: Paolo R. Zafred, Murrysville, PA (US); James E. Gillett, Greensburg, PA (US)

(73) Assignee: Siemens Energy, Inc., Orlando, FL (US)

( * ) Notice: Subject to any disclaimer, the term of this patent is extended or adjusted under 35 U.S.C. 154(b) by 428 days.

(21) Appl. No.: 12/543,718

(22) Filed: Aug. 19, 2009

(65) Prior Publication Data

US 2011/0045372 A1     Feb. 24, 2011

(51) Int. Cl.
*H01M 8/12* (2006.01)
*H01M 8/24* (2006.01)

(52) U.S. Cl. ........ 429/466; 429/441; 429/458; 429/460; 429/469

(58) Field of Classification Search .......................... None
See application file for complete search history.

(56) References Cited

U.S. PATENT DOCUMENTS

| | | | |
|---|---|---|---|
| 4,374,184 A | 2/1983 | Somers et al. |
| 4,428,895 A | 1/1984 | Blasch et al. |
| 4,476,198 A | 10/1984 | Ackerman et al. |
| 4,490,444 A | 12/1984 | Isenberg |
| 4,520,082 A | 5/1985 | Makiel |
| 4,569,920 A | 2/1986 | Smith-Johannsen |
| 4,664,986 A | 5/1987 | Draper et al. |
| 4,728,584 A | 3/1988 | Isenberg |
| 4,801,369 A | 1/1989 | Draper et al. |
| 4,874,678 A | 10/1989 | Reichner |
| 5,741,605 A | 4/1998 | Gillett et al. |
| 5,916,700 A | 6/1999 | Ruka et al. |
| 6,656,623 B2 | 12/2003 | Holmes et al. |
| 7,157,172 B2 | 1/2007 | Draper et al. |
| 7,320,836 B2 | 1/2008 | Draper et al. |
| 7,364,812 B2 | 4/2008 | Taylor et al. |
| 2008/0003478 A1 | 1/2008 | Greiner et al. |

FOREIGN PATENT DOCUMENTS

WO     WO 02/37589     5/2002

OTHER PUBLICATIONS

Nguyen Q. Minh, "Ceramic Fuel Cells", Journal of the American Ceramic Society, vol. 76, No. 3, pp. 563-588, 1993.

*Primary Examiner* — Jonathan Crepeau

(57) ABSTRACT

A plurality of integral bundle assemblies contain a top portion with an inlet fuel plenum and a bottom portion containing a base support, the base supports a dense, ceramic air exhaust manifold having four supporting legs, the manifold is below and connects to air feed tubes located in a recuperator zone, the air feed tubes passing into the center of inverted, tubular, elongated, hollow electrically connected solid oxide fuel cells having an open end above a combustion zone into which the air feed tubes pass and a closed end near the inlet fuel plenum, where the open end of the fuel cells rest upon and within a separate combination ceramic seal and bundle support contained in a ceramic support casting, where at least one flexible cushion ceramic band seal located between the recuperator and fuel cells protects and controls horizontal thermal expansion, and where the fuel cells operate in the fuel cell mode and where the base support and bottom ceramic air exhaust manifolds carry from 85% to all of the weight of the generator.

18 Claims, 10 Drawing Sheets

FUEL CELL INTEGRAL BUNDLE ASSEMBLY INCLUDING CERAMIC OPEN END SEAL AND VERTICAL AND HORIZONTAL THERMAL EXPANSION CONTROL

GOVERNMENT CONTRACT

The Government of the United States of America has rights in this invention pursuant to Contract No. DE-FC26-05NT42613 awarded by the U.S. Department of Energy.

BACKGROUND OF THE INVENTION

1. Field of the Invention

This invention relates to integral bundle assemblies that must be used for solid oxide electrolyte fuel cell stack to be a cost effective power source. The present invention relates to the arrangement of components for the bundle assemblies including open end fuel cell seals and other components necessary to control vertical and horizontal thermal expansion control.

2. Description of the Prior Art

High temperature solid oxide electrolyte fuel cells (SOFC) have demonstrated the potential for high efficiency and low pollution in power generation. Successful operation of SOFCs for power generation has been limited in the past to temperatures of around 1000° C., due to insufficient electrical conduction of the electrolyte and high air electrode polarization loss at lower temperatures. U.S. Pat. Nos. 4,490,444 and 5,916,700 (Isenberg and Ruka et al. respectively) disclose one type of standard, solid oxide tubular elongated, hollow type fuel cells, which could operate at the above described relatively high temperatures. In addition to large-scale power generation, SOFCs which could operate at lower temperatures would be useful in additional applications such as auxiliary power units, residential power units and in powering light-duty vehicles.

At the outset, it should be noted that due to the interplay of components and multiple views in various figures, there will be some shifting between figures, to better understand the prior art and the invention. Solid oxide electrolyte fuel cell (SOFC) generators that are constructed in such a way as not to require an absolute seal between the oxidant and the fuel streams, and presently use closed ended fuel cells of circular cross section, are shown in FIG. 1 of the drawings, with the closed end at the base of the SOFC Generator as shown in FIG. 5 of the drawings. Air flows inside the tubes on the cathode and fuel flows outside on the anode. The reaction of the fuel at the anode involves relatively pure fuel, for example, a mixture of hydrogen and carbon monoxide. To provide such fuel, feed natural gas can be catalytically reformed using, for example, nickel at a variety of locations, such as outside the SOFC generator or even, in-situ on the anode, as taught by Somers et al. in U.S. Pat. No. 4,374,184. On the other hand, air passes through a ceramic feed tube, exits at the end of a ceramic cell and reverses flow to diffuse through the inner fuel cell ceramic air electrode. Generally, the air is preheated by an exterior preheater or by an interior recuperator near a combustion area, such as described by Makiel in U.S. Pat. No. 4,520,082 and Draper et al. in U.S. Pat. No. 7,320,836. In these cells, interconnection, electrolyte and fuel electrode layers are deposited on an extruded and sintered lanthanum manganite air electrode tube by plasma spray or other techniques. In one embodiment, a lanthanum chromite interconnection is in the form of a narrow strip that runs axially over the entire active length of the air electrode tube; a yttria stabilized zirconia solid electrolyte is deposited in such a way as to almost entirely cover the air electrode tube, where this yttria stabilized zirconia does not become an active electrolyte until a temperature over about 700° C. is achieved in the fuel cell; and the electrolyte layer contacts or overlaps the edges of the interconnection strip leaving most of the interconnection exposed. Because the interconnection and electrolyte layers are dense, an overlap feature can provide a seal that prevents high temperature leakage of fuel.

In this embodiment, a nickel/yttria stabilized zirconia cermet, fuel electrode anode layer is deposited in such a way as to almost entirely cover the electrolyte, but leaves a narrow margin of electrolyte between the interconnection and the fuel electrode, where this margin prevents shorting of the cell; and series electrical connection between cells is accomplished by means of a structure made from nickel mesh, or, more recently, nickel foam and nickel screen, as shown in U.S. Pat. No. 7,157,172 B2 A1 (Draper et al.). The foam part of the connection becomes sintered to the interconnection while the screen part becomes sintered to the fuel electrode of the adjacent cell. Problems associated with the tubular cell, are limited power density, long current path, and potential bowing along its length during and after sintering.

Another cell geometry has been disclosed or patented in which the lanthanum manganite air electrode has the geometric form of a number of integrally connected elements of triangular or "delta" like cross section, see FIG. 2 of the drawings. These triangular, elongated, hollow cells have been referred to in the prior art in some instances as Delta X cells where Delta is derived from the generally triangular shape of the elements and X is the number of elements. These type cells are described for example in basic, Argonne Labs U.S. Pat. No. 4,476,198; and also in U.S. Pat. No. 4,874,678; U.S. Patent Application Publication U.S. 2008/0003478 A1, and International Publication No. WO 02/37589 A2 (Ackerman et al., Reichner; Greiner et al., and Thomas et al. respectively). An encyclopedic publication by N. Q. Minh, in "Ceramic Fuel Cells", *J. Am. Ceramic Soc.*, 76 [3] 563-588, 1993 describes in detail a variety of fuel cell designs, including the tubular and triangular and other types, as well as materials used and accompanying electrochemical reactions.

Generally, in newer triangular, tubular, elongated, hollow cross-section, so called delta or Delta X cells, the resulting overall cross section has a flat face on the interconnection side and a multi-faceted triangular face on the anode side. Airflows within the internal discrete passages of triangular shapes where, at the end of the cell, the air can reverse flow to diffuse through the porous air electrode if air feed tubes are used. In the Greiner et al. publication, providing cell end closure, above, a transverse channel is used to cause reverse flow so air passes down one channel and up an adjacent one so air feed tubes can be eliminated. The fuel channels are built into multiple adjacent units of the triangular tubular type cells, and provide better fuel distribution and equal cross-section of air and fuel channels.

In the triangular tubular, elongated, hollow, so called delta or Delta X cells, a dense lanthanum chromite interconnection covers the flat face. A yttria-stabilized zirconia electrolyte usually covers the multifaceted triangular face and overlaps the edges of the interconnection but leaves most of the interconnection exposed. A standard nickel/yttria stabilized zirconia fuel electrode usually covers most of the electrolyte but leaves a narrow margin of electrolyte between the interconnection and the fuel electrode. Series electrical connection between cells can be accomplished by means of a flat nickel felt or nickel foam pads, one face of which is sintered to the interconnection while the other face is sintered to apexes of the triangular multifaceted fuel electrode face of the adjacent cell. This felt or foam also aids in combination cell-to-cell connector thermal expansion control properties.

Most of these designs utilize ceramic air feed tubes, which present their own set of issues, since it is difficult to manufacture long, completely round and straight ones. This in turn can create problems of binding when insertion into the air feed channel of the cells is attempted.

Because of their large active area, triangular, elongated, hollow, seal-less cells, shown in FIG. 2, operate at higher current than cylindrical cells and stack packing density is improved. Relative to cylindrical cells, triangular tubular cells achieve less ohmic resistance, therefore cell voltage can be closer to theoretical Nerst potential; however, tubular fuel cells are easier to manufacture, are more robust and both are useful in the current inventive design. The triangular, elongated, hollow cell, in particular, because of its thin triangular cross-sectional configuration poses particular difficulties in sealing, at open ends, and in providing transverse recirculation gas extraction.

Other tubular, elongated, hollow fuel cell structures are described by Isenberg in U.S. Pat. No. 4,728,584—corrugated design, in U.S. Patent Application Publication U.S. 2008/0003478 A1 by Greiner et al. —triangular, quadrilateral, oval, stepped triangle and a meander; all herein defined as "hollow elongated tubes". FIG. 3 describes a hybrid transitioned fuel cell with a flattened open non-active cross section and a triangular ($\Delta$ cross-section) merged and, morphed onto each, another SOFC design possibility.

U.S. Pat. No. 6,656,623 (Holmes et al.) illustrates, in FIG. 5 of this application, a standard SOFC configuration with closed end down fuel cells and oxidant entry through the top of the generator, as has been the case since the basic Isenberg concept of U.S. Pat. No. 4,490,444, and is still the state of the art. Also, more clearly shown is a cut-away section of one fuel cell showing the end of the cell and an air feed tube. At the top of the fragile ceramic fuel cells, heavy exhaust ducts, and air inlet plenums feeding to oxidant feed tubes are shown, all requiring very substantial support to not harm the closed end down SOFC tubes. The same is particularly true with U.S. Pat. No. 4,664,986 (Draper et al.), where massive metal overhead conducts are taught. U.S. Pat. No. 5,741,605 (Gillett et al.), illustrates a massive top weight oxidant distribution assembly on top of the bundles, and a massive oxidant inlet channel at the top of the SOFC stack.

Also, U.S. Pat. No. 4,801,369 (Draper et al.) teaches an apparatus having SOFC operating in a mode where the fuel cells are taught closed end up, at the top of the generator, and open end down; but the cells are operated by applying electricity to electrically dissociate water into $H_2$ and $O_2$. Here, electrons are not generated as in the SOFC mode, but are fed to generate $O_2$ in an electrolyzer mode—which is the exact opposite of a fuel cell mode where electrons are generated. In Draper et al., $O_2$ is discharged as the main product via a duct at the bottom of the generator, rather than providing air or $O_2$ in to be reacted within the fuel cell to exit as depleted oxidant, steam is added at the bottom of the generator as well as through a line (not shown) at the bottom of the generator. This pure steam flow is added to provide a buffer zone or seal between oxygen and hydrogen regions. Also, in addition to gas seals, Draper et al. did not address thermal expansion of large units. Electricity input between electrodes causes the steam to dissociate into $H_2$ and $O_2$. This is non-equivalent in any sense to providing $H_2$ and $O_2$ to provide electricity.

U.S. Pat. No. 7,364,812 (Taylor and Zymboly) also utilize inverted fuel cells in a SOFC mode, shown in FIG. 6. There fuel is reformed in special fuel feed tube assemblies involving feed fuel reverse flow to contact interior nickel catalyst, rather than free flow from entry plenum to fuel cell outside surface. Three horizontal seal locator/plenum separation strips are utilized to connect to adjacent bundles.

Reiterating, solid oxide electrolyte fuel cell (SOFC) generators usually include a gas-tight, thermally insulated external container which houses individual chambers including a fuel cell chamber and a combustion chamber. The fuel cell chamber, in which power generation occurs, contains a solid oxide fuel cell stack which is made up of an array of series-connected solid oxide fuel cells, with associated fuel and air distribution means. The solid oxide fuel cells contained in the generator chamber can take on a variety of well known configurations, including tubular, flat plate, and corrugated or delta, etc. designs.

More specifically, FIG. 1 shows a prior art hollow elongated tubular solid oxide fuel cell 10, which operates primarily the same as the other designs that are discussed later but will be described here in some detail, because of its simplicity, and because its operating characteristics are universal and similar to both flattened and tubular, elongated hollow structured fuel cells such as triangular and delta SOFC's. Most components and materials described for this SOFC will be the same for the other type fuel cells shown in the figures. A preferred SOFC configuration has been based upon a fuel cell system in which a gaseous fuel F, such as hydrogen and carbon nonoxide derived from reformed pipeline natural gas is directed axially over the outside of the fuel cell, as indicated by the arrow F. A gaseous oxidant, such as air or oxygen O, is fed preferably through a hollow air/oxidant feed tube, here called air feed tube 12, concentrically positioned within the annulus 13 of the fuel cell, and extending near the closed end of the fuel cell (not shown, but closed end seen in FIG. 5 at 92), and then out of the air feed tube back down the fuel cell axially over the inside wall of the fuel cell, while reacting to form depleted gaseous air or oxygen, as indicated by the arrow O' as is well known in the art.

Returning to FIG. 1, the prior art solid oxide fuel cell shown comprises a hollow elongated tubular air electrode 14 (or cathode). The air electrode 14 may have a typical thickness of about 1 mm to 3 mm. The air electrode 14 can comprise doped lanthanum manganite having an $ABO_3$ perovskite-like crystal structure, which is extruded or isostatically pressed into tubular shape or deposited on a support structure metal or ceramic and then sintered.

Surrounding most of the outer periphery of the air electrode 14 is a layer of a dense, solid electrolyte 16, which is gas tight and dense, but oxygen ion permeable/conductive, typically made of calcia- or yttria-stabilized zirconia. The solid electrolyte 16 is typically about 0.001 mm to 0.1 mm thick, and can be deposited onto the air electrode 14 by conventional deposition techniques such as EVD or plasma spray.

In the prior art design, a selected radial segment 20 of the air electrode 14, preferably extending along the entire active cell length, is masked during fabrication of the solid electrolyte, and is covered by a interconnection 22, which is thin, dense and gas-tight and provides an electrical contacting area to an adjacent cell (not shown) or to a bus bar power contact (not shown). The interconnection 22 is typically made of lanthanum chromite ($LaCrO_3$) doped with calcium, barium, strontium, magnesium or cobalt. The interconnection 22 is roughly similar in thickness to the solid electrolyte 16. An electrically conductive top layer 24 typically nickel plating is also shown.

Surrounding the remainder of the outer periphery of the tubular solid oxide fuel cell 10, on top of the solid electrolyte 16, except at the interconnection area, is a fuel electrode 18 (or anode), which is in contact with the fuel during operation of the cell. The fuel electrode 18 is a thin, electrically conductive, porous structure, typically made of nickel-zirconia or cobalt-zirconia cermet approximately 0.03 mm to 0.1 mm thick. As shown, the solid electrolyte 16 and fuel electrode 18 are discontinuous, with the fuel electrode being spaced-apart from the interconnection 22 to avoid direct electrical contact.

Referring now to FIG. 2, a prior art, very high power density solid oxide fuel cell stack is shown. The cells are triangular solid oxide fuel cells 30. Here the triangular air electrode 34 has the geometric form of a number of integrally connected elements of triangular cross section. The air electrode can be made of lanthanum manganite. The resulting overall cross section has a flat face on one side and a multifaceted face on the other side. Air O flows within the discrete channels of triangular shape as shown. An interconnection 32 generally of lanthanum chromite covers the flat face. A solid electrolyte covers the multifaceted face and overlaps the edges of the interconnection 32 but leaves most of the interconnection exposed. The fuel electrode 38 covers the reverse side from the flat face and covers most of the electrolyte but leaves a narrow margin of electrolyte between the interconnection and the fuel electrode. Nickel/yttria stabilized zirconia is generally used as the fuel electrode which covers the reverse side. Series electrical connection between cells is accomplished by means of an electrically conductive top layer 35 of flat nickel felt or nickel foam combination pads one face of which is sintered to the interconnection while the other face is sintered to the apexes of the triangular multifaceted fuel electrode face of the adjacent cell. An example of a dimension is width 36, about 150 mm and cell plate thickness—about 15 mm. This triangular cell design is active throughout the entire length spanning the interconnection. Fuel is shown as F.

FIG. 3 illustrates a hybrid transitioned solid oxide fuel cell 40 having a triangular, active length 44 having a triangular active cross-section. The inactive cross-section 46 has flattened parallel sides 48, as shown. One out of eight hollow air feed tube 49 is also shown.

Refer now to FIG. 4, which is a standard triangular delta cell, where inlet air is in counter flow mode to outlet air, and which better illustrates the operational aspects of a delta cell. Solid oxide fuel cell 40 has a full triangular active length 44 with a triangular active cross-section. This triangular active cross-section contains a bottom interconnection 45 as well as an air electrode, fuel electrode, interconnection and solid oxide electrolyte therebetween. Channels 62 in the open-face will all contain hollow air feed tubes 49, although one is only shown for sake of simplicity.

Fuel F passes between and outside the triangles as at 65 contacting a fuel electrode on the active outside side of the triangles to provide reacted spent fuel 66 which passes through the separation between adjacent fuel cells. A separate triangular sintered end piece 72 is also shown.

Process air O is fed into the air feed tube 49 and passes to the closed end 74 where it reverses flow, passing upwards in the annular space between the cell cathode and the air feed tube back through the air passage, as shown, while contacting the air electrode within the channels to provide depleted air stream 76 which exits at the open end of the cells, enters a combustion zone (not shown) and reacts with spent fuel.

FIG. 5 (Holmes et al., U.S. Pat. No. 6,656,623—FIG. 2) illustrates, as of its issue date of 2003, standard fuel cell generator structure with a massive insulation board components 86, air inlet plenum 82 with top air O feed 84, air feed tube support board 87 and composite, sliding fuel cell seal and positioning gasket 88, all supported generally by the fuel cells or peripheral components. Also shown are bottom insulation board 86' as well as bottom fuel distribution boards 90. As shown, SOFC fuel cell bundles are closed end down, 92 showing the closed end, with air feed tubes 94 extending to the bottom of the cell. Fuel F enters at the bottom of the cell as shown.

FIG. 6 (Taylor and Zymboly, U.S. Pat. No. 7,364,812—FIG. 2A) is an inverse fuel cell design with fuel reformation assemblies 150 surrounding the fuel cells. Spacer plates 152, 154, 156, 158 and alignment pins 160, 162, 164 form the support structure. The inverted hollow tubular fuel cell 166 contains hollow air feed tube 168. Fuel F enters at opening 170, passes into fuel supply manifold 172 and flows down and reverse flows up reformation assemblies 150 to become reformed fuel F'. Catalysts within reformation assembly 150 can reform feed natural gas. Seal locator strips 174 are used to connect adjacent fuel cell bundles. Air is shown as O with arrows showing its flow patterns. This design does not allow for controlled thermal expansion between bundles during operation, and the internal reformation assemblies take up at least 20 vol. % of the SOFC cross-section and prevents close contact of fuel cells for efficient packaging and electrical distribution. There is no suggestion of reformation in-situ on the cell.

As described above, there is a long felt need for a fuel cell bundle assembly design that can actually compete as a central part of an energy source in real world situations, and work in large generators having module bundle rows of up to or exceeding ten bundles. Many have provided proof-of-concept pilot processes where basic component costs are unrealistic in a commercial market. What is needed is a dramatic redesign and rethinking of how the entire to date SOFC generator operates. It is a main object of this invention to provide a departure from previous prototypical, costly, generally non-commercial designs. It is another object to provide a cost effective design for commercial SOFC bundle assembly design that has to have revolutionary rethinking to dramatically reduce costs and improve SOFC generator internal volume electrical generation.

SUMMARY OF THE INVENTION

The above needs are supplied and objects accomplished by providing an integral bundle assembly comprising: a top inlet fuel portion; an inlet fuel stream near the top portion; inverted, tubular, elongated, hollow, electrically connected solid oxide fuel cells disposed below the top portion, the fuel cells set to operate in the fuel cell mode; internal heat recuperator disposed below the fuel cells; an open end fuel cell seal between a combustion zone and fuel cells; two cushion ceramic band seal layers between the open end fuel cell seals and the recuperator which cushion band seal layers control horizontal thermal expansion between integral bundle assemblies; a bottom portion of dense ceramic casting having a plurality of bottom legs formed as a ceramic exhaust manifold supporting the recuperator and fuel cells; and inlet air feed tubes feeding to the fuel cells, the air feed tubes connecting with a bottom oxidant feed, where the open end fuel cell seals comprise a ceramic seal that conforms to the open ends of the fuel cells which fuel cells rest upon separate fuel cell bundle support beams. Preferably, both the seal and support beam are disposed in a separate support casting, all above a combustion zone, a recuperator, and at least one cushion ceramic band seal that accommodates thermal expansion. Additionally, a metallic sliding pin disposed in the inlet fuel top portion, along with the plurality of bottom legs of the bottom portion ceramic casting provide a vertical integral bundle assembly thermal expansion center and where the bottom portion of dense ceramic casting carries all of the internal weight of the integral bundle assembly.

The invention also resides in a plurality of integral bundle assemblies each comprising: a top inlet fuel portion including a top plate and a top vertical metallic sliding pin which is slidable within the top plate of the assemblies, to accommodate assembly axial thermal expansion and a bottom portion receiving air inlet feed, which is made of dense, molded casting formed as a ceramic air exhaust manifold part which air exhaust manifold part is below and provides a receptacle for an air inlet box and inlet air feed tubes, the exhaust manifold located below an internal heat recuperator, said air feed tubes passing into the center of inverted, tubular, elongated, hollow electrically connected solid oxide fuel cells having an open end above the internal heat recuperator, through which the air feed tubes pass and a closed end near the inlet fuel portion, said fuel cells comprising a fuel cell stack bundle, where the fuel cells operate in the fuel cell mode and where the bottom ceramic air exhaust manifolds carry at least 85% of the internal weight of the integral bundle assembly, and ceramic exhaust manifold bottom four point ceramic legs (keyways) provide a central axis with the top sliding metallic pin to provide a vertical integral bundle assembly thermal expansion center, where each integral bundle assembly is separated from adjacent bundle assemblies by at least one flexible, circumferentially disposed, cushion ceramic band seal layer located between the recuperator and the fuel cells, and where a ceramic seal conforms to the open end of the fuel cells which rest upon a separate fuel cell bundle support beam, the combination seal and support beam disposed in a separate ceramic support casting, all disposed above the cushion ceramic band seal layer; and where the interior of the integral bundle assemblies contain primarily electrically generating components. The air exhaust manifold part is mounted on a metallic base support.

This novel design solves problems of internal thermal expansion, orientation of the fuel cells and, providing a tolerant seal providing mechanical support of the fuel cell bundle without deformation or loss of compliance over service life. This design utilizes high thermal shock resistant, 90 vol. % to 98 vol. % dense cast ceramics as a major support for the entire top structure of the integral bundle assembly.

As used herein, the term "tubular, elongated, hollow" solid oxide fuel cells is defined to include: triangular, that is wave type; sinusoidally shaped wave; alternately inverted triangular folded shape; corrugated; delta; Delta; square; oval; stepped triangle; quadrilateral; and meander configurations, all known in the art. Also, the term "bundle" means a grouping of at least one fuel cell and the term "integral bundle assembly" will be further defined later in relation to FIGS. 7 and 8.

BRIEF DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Figure 1:
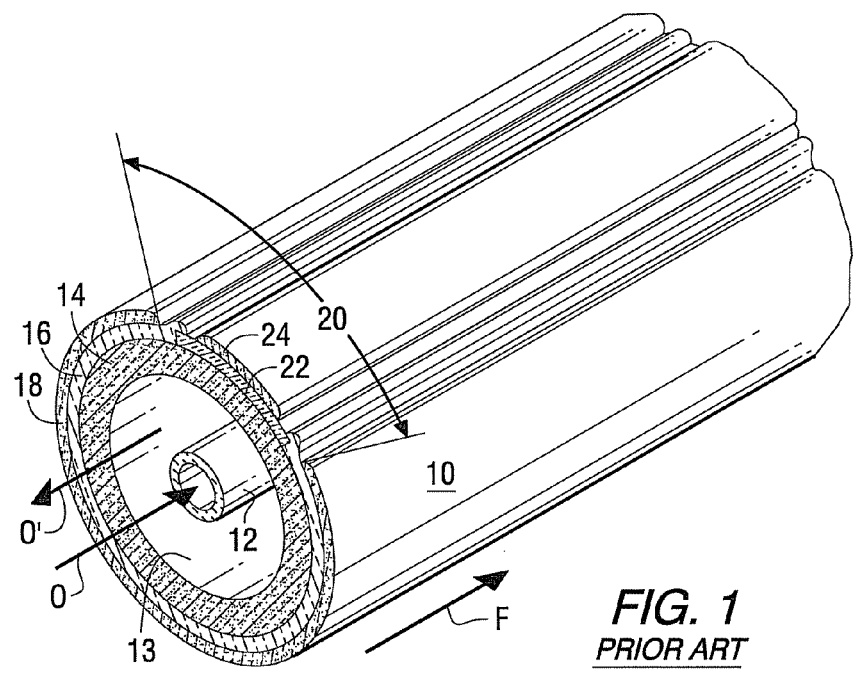
FIG. 1 is a sectional perspective view of one type prior art tubular solid oxide fuel cell showing an air feed tube in its center volume.
Figure 2:
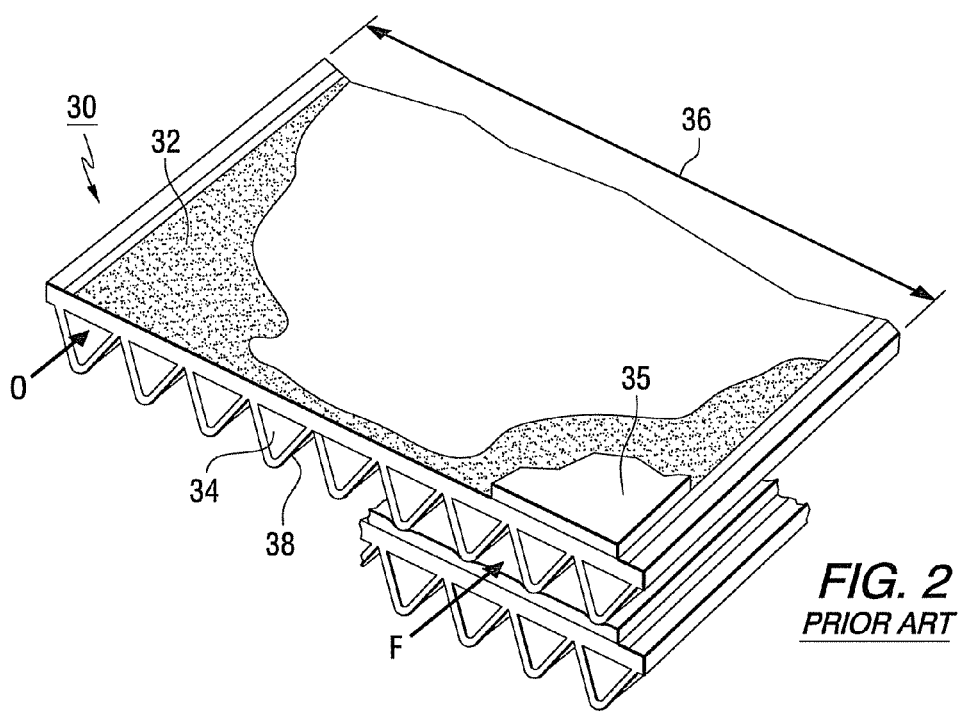
FIG. 2 is a sectional perspective view of one type prior art delta triangular type, solid oxide fuel cell of two sets of fuel cells, showing oxidant and fuel flow paths but not air feed tubes for sake of simplicity.
Figure 3:
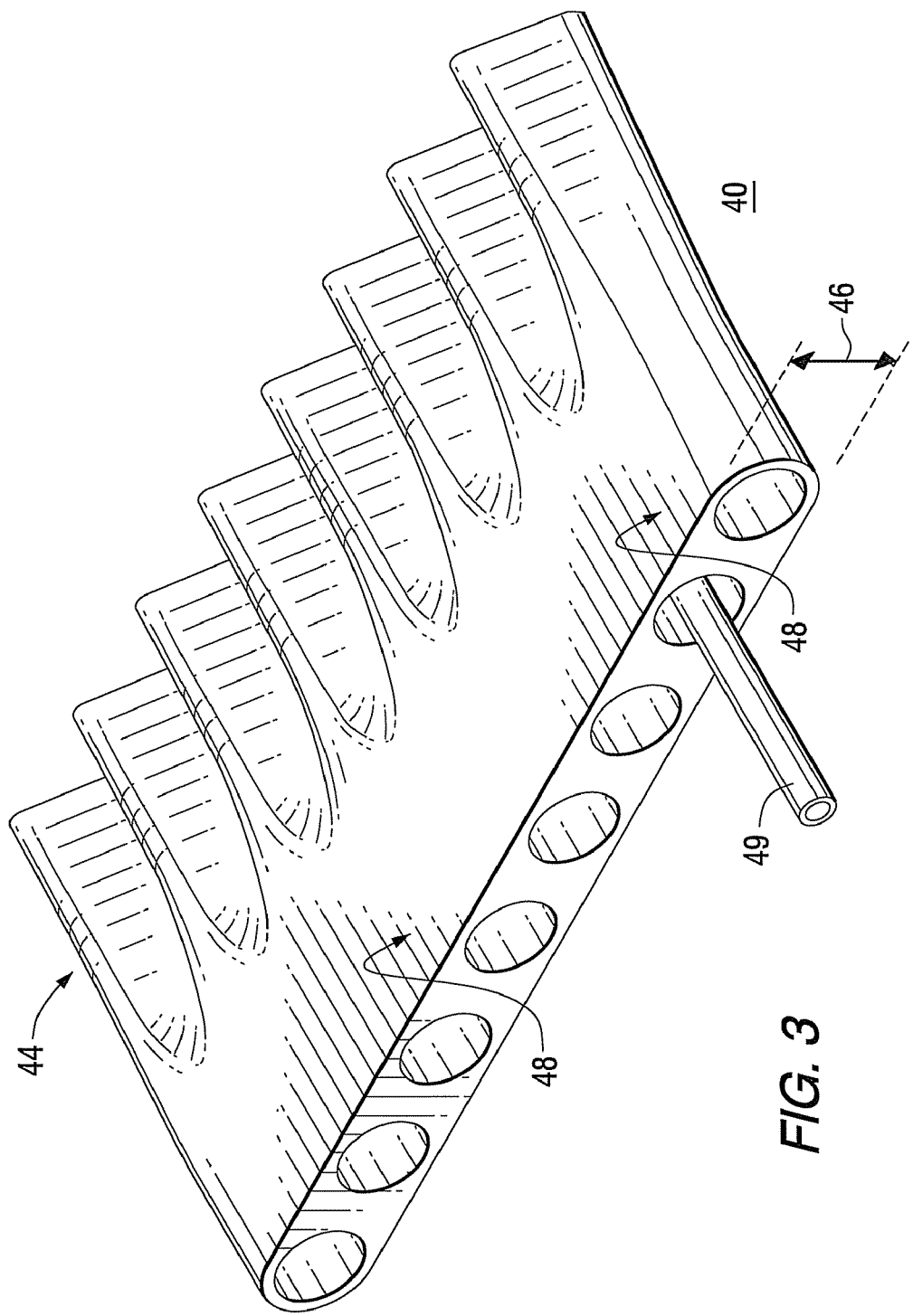
FIG. 3 is a foreshortened, three dimensional top view of a portion of a hybrid, transitioned fuel cell with a flattened open non-active cross-section and a Delta/triangular active section merged into each other, where only one air feed tube is shown for sake of simplicity.

Referring now, having spent lengthy discussion on prior art operation and materials used in "tubular, elongated, hollow electrically connected" SOFC, particularly in tubular and Delta (delta) configuration, all of which is important to understand; we now turn to the invention. The invention solves problems, not in operation or proof of concept, because SOFC's do work well and are non-polluting; but in how to make SOFC components fit together to make economical large size SOFC generators work commercially. How to make them real, useful, space efficient, low cost and to continue to be non-polluting—an ever important consideration. Their entire configuration, going back to basic Isenberg (U.S. Pat. No. 4,490,444) has been proof of design, but that did not yet make large size viable as an energy competitor in the real world of nuclear power, gas turbine, and coal generated electricity.

This invention is, in many instances, a departure from previous prior patent and published SOFC art. It fundamentally changes the entire arrangement of what has been previously presented as standard solid oxide fuel cell modules, well known in the art since 1983, for development and sale to their customers. This invention developed from the realization that previous approaches were unlikely to ever be ultimately cost effective. Any overall module architecture must have a design strategy and an implementation of a design solution for each of the fundamental design problems associated with a large solid oxide cell module (>100 kWe). An elegant solution in one area could easily result in a conflict with another design consideration, rendering the solution in the one area not as elegant.

The present invention relates to the manner in which groups of solid oxide fuel cells integral bundles can be arranged to form a practical array for large stationary power applications. The invention includes the special configurations of the sub components necessary to implement the invention.

This invention defines a configuration, using a minimum of parts, such that each group of solid oxide fuel cells, contained within each unitary, separate integral bundle assembly has its own air delivery system, recuperator, exhaust plenum, and structural support for dead weight. Most key components are complex cast ceramic shapes. Use of these ceramics has distinct advantages with respect to high temperature performance and cost. It is key to have an arrangement where heavy and complex cast ceramic components can be used to reduce the overall cost of the power produced. This invention and its prototypes have already demonstrated it is very unlikely that an alternate approach could be competitive with respect to cost.

There is a distinct advantage of this invention where the close end of the cell is in the up position compared to the heretofore generally universal design where the close end is in the down position. This configuration provides advantages for the cell open seal in that no axial thermal expansion occurs at the seal. It is the most forgiving arrangement for the solid oxide fuel cell in that the cells need only support themselves. This arrangement removes any of the dead weight loading due to the heavy cast ceramic components forming the sub components of this invention from the solid oxide fuel cells. Supporting the cast ceramic components with previous arrangements would not be possible using anything close to being cost competitive. The integral bundle assembly can be placed into arrays of integral bundle assemblies to form much larger units for stationary power generation. This is possible by each integral bundle assembly having its own thermal center. Extrapolation to larger units follows easily.

The present invention also relates specifically to new and useful fuel cell sealing systems. The design of tubular SOFC stacks requires that preferably fuel enters the stack at the cell closed end and flows in the space between cells. As the fuel travels over the cells, it is subject to electrochemical reaction. Typically, a fraction of the depleted fuel is recirculated, while a fraction is mixed with vitiated air in the combustion zone. Air enters at the opposite end of each cell through an air feed tube concentrically positioned within each air channel, exits the air feed tube at the closed end, and flows downward in the annular space between the air feed tube and the cell channel wall.

As the fuel and air flow from the cell closed end to the open end, most of the fuel is electrochemically reacted with oxygen from the air producing electricity. The depleted fuel exiting the cell bundle is combusted with the vitiated air exiting the bundle into a combustion zone to form exhaust gas. In this configuration, no absolute seals are required to separate the fuel stream from the air stream due to the closed end design of the tubular SOFC and the use of air feed tubes.

However, there is a need to provide a tolerant seal to function as a porous partition barrier between the recirculation and combustion zones of SOFC fuel cell generators. In particular, the porous barrier is designed to extract depleted fuel from the active region of the stack and mix it with the depleted air from the SOFC's to combust the unreacted fuel in the combustion zone. This is accomplished by incorporating a plurality of flow orifices sized to equalize the flow distribution exiting into the combustion zone over a plurality of bundle assemblies. Furthermore, the tolerant seal is supposed to provide mechanical support of the bundle and closed end casting, without deformation or loss of compliance over the service life.

During normal operation, the fuel cell open end seal surface facing the combustion zone is exposed to temperatures up to 1,000° C. in a combustion atmosphere containing spent fuel which typically contains 51% hydrogen, 5% carbon monoxide and 28% carbon dioxide. Transient conditions could significantly rise the temperature up to 1,000° C.-1, 100° C. as a result of hydrogen combustion in the combustion zone. Therefore, the seal and its associated ceramic castings materials must be carefully selected to survive the harsh environment and severe operating conditions. Particularly, the seal base material must be 1) compatible with other SOFC components and cell environment, 2) have the ability to withstand high working temperatures, 3) be closely thermally matched to the SOFC air electrode material, and 4) have good sealing properties. Also, lifetime effects, such as phase stability, thermal expansion compatibility, element migration, conductivity and aging, must be addressed and characterized to the extent possible.

Figure 4:
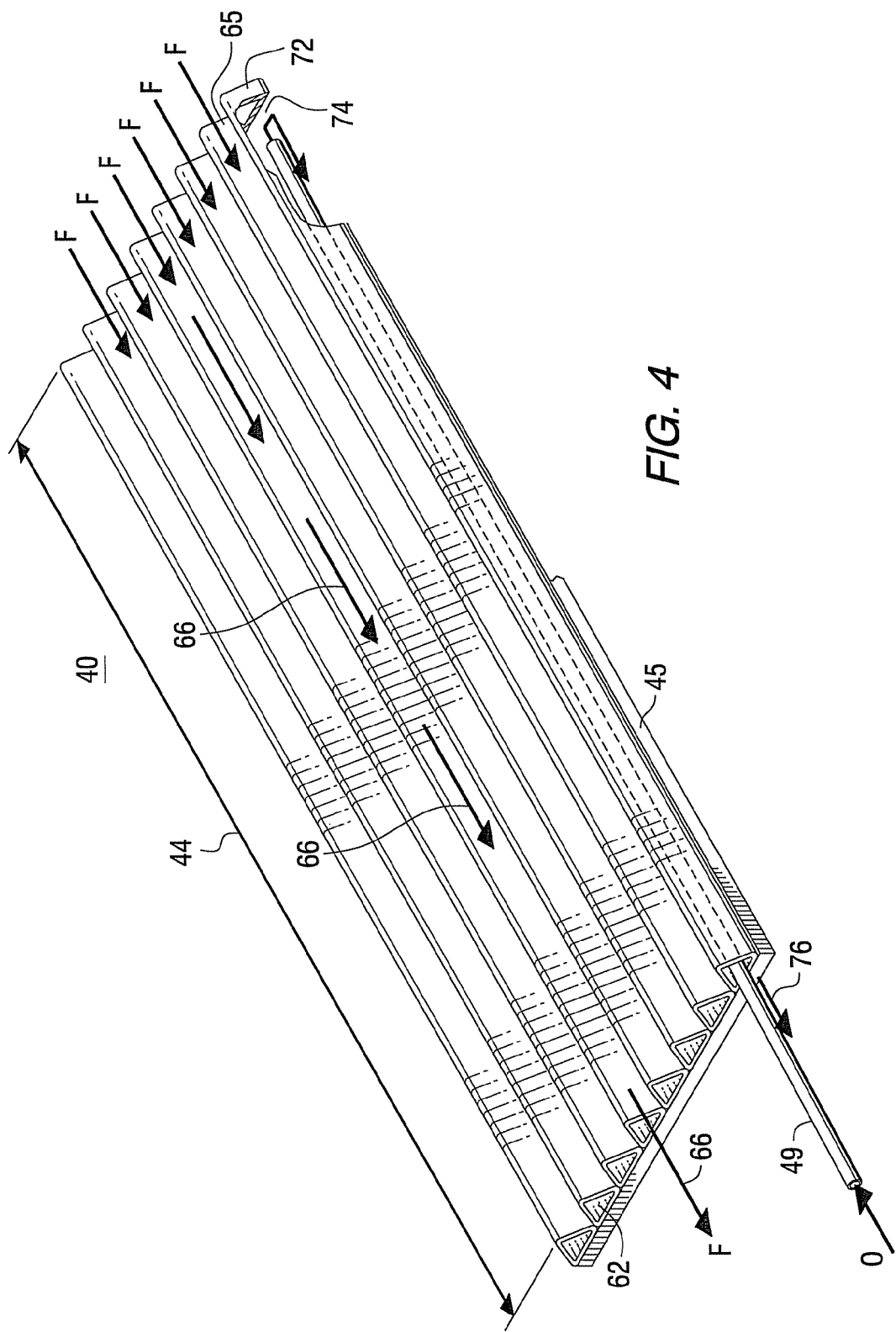
FIG. 4, which shows the operation of a delta/triangular fuel cell, is a sectional perspective view of a hybrid, transitional solid oxide fuel cell showing air feed tube placement, with only one air feed tube shown for simplicity, and air/oxidant and fuel flows.

In summary, the key functional requirements for the fuel cell open end seals are:

Its shape must conform to Delta-8 peaks and valleys; or tubular cell or hybrid ends (as shown in FIG. 4) and accommodate irregular non-uniform cell and bundle geometry;

must provide bundle registration and air feed tube alignment with Delta channels;

protect cut end of cell from high temperature combustion gases;

capable to accommodate differential thermal expansion between cell and alumina casting;

must provide sufficient fuel flow impedance between spent fuel region and combustion zone to control and distribute open end burning and make it as uniform as possible by providing spent fuel orifices for uniform flow into the combustion zones;

maintain its sealing performance after multiple thermal cycling;

material sufficiently strong to support dead weight of bundle and closed end casting creep resistant ceramic material, for long life (100,000+ hrs.) in dual atmosphere at 1,000+° C.; and low cost part, manufacturing, process conductive to automation for high volume production.

Clearly, the combination of all these requirements is very demanding and a new design approach is necessary to produce a cost-effective SOFC open end seal system. The innovative sealing and support system that is one object of this invention is designed to improve the functionality of the component, to increase the availability of the fuel cell generator and ultimately offer a cost effective solution to the pressing demand for highly efficient, low cost SOFC systems. The successful attainment of the proposed Advanced SOFC Module concept is dependent on the technology for reliably partitioning the upper fuel rich zone of the stack from the lower oxygen rich zone since oxygen and hydrogen cannot coexist above the auto-ignition temperature.

One design approach would be to seal the cell open ends to a partitioning ceramic board. However, conventional ceramic cements lack the compliance and flexibility needed to seal the cell open ends and to provide a gas tight seal at high temperature. The stiffness of the cement does not accommodate thermal differential expansion between parts causing the cement to crack and open small gaps between surfaces, resulting in leakage. Therefore, our main approach in material selection for the open end seal is utilization of fibrous ceramics because of their excellent capability to accommodate geometry variations, thermal growth, steep thermal gradients and still provide sufficient flow impedance. However, a compliant fibrous open end seal requires a rigid frame to contain and support the dead weight of the bundle and upper closed end casting. Therefore, structural parts, such as open end casting and Support Beams, are made of high density, high strength ceramics using the freeze casting process. This is a relatively low cost manufacturing process which allows dense alumina ceramics to be made in net-shape without need for expensive machining.

The process to make these specialized seals utilizes recent nanotechnology advances to strongly bind together ceramic slurries containing proprietary temperature-sensitive inorganic binders. After casting into engineered molds, these slurries precipitate irreversibly and, upon firing, convert to alumina-silicate or mullite bonds. Ceramic shapes shrink minimally and predictably, normally less than 0.5% during firing, therefore, this is one of the few processes that can be claimed as true net shape manufacturing and ideally suited for open end seal castings. This will be discussed below with regard to several basic patents in this area.

The use of high purity, 99% pure $Al_2O_3$, insulation board as a structural material needed extensively in prior art to obtain prior art designs, needs to be seriously reduced. This high purity board material is very expensive. It can approach the cost of the cell on an enclosed volume basis. Further, the boards always require machining which adds to the cost. Boards are quite fragile and result in significant yield problems. When structural support is required from these boards, significant amounts of space is required because of the low permissible stress levels of these boards. A module architecture that uses a more efficient material is required.

This invention relies on a high technology type cast inorganic slurry based, fired ceramic, preferably freeze cast, inorganic slurry based, fired, extremely high temperature, extremely high thermal shock cast ceramic of 90 vol. % to 98 vol. % density having very strong interfacial bond layers, as taught by U.S. Pat. Nos. 4,428,895 and 4,569,920 (Blasch-Smith-Johannson, respectively). These cast alumina ceramic components provide the more efficient shapes needed to replace high purity insulation board. This limits use of high purity insulation board for dielectric insulation and minor filling function within the module. Less expensive blanket material can be used in most cases to replace high purity insulation board. These Blasch-Smith-Johannson type base castings are produced as a laminated or layered multi-ceramic material composed of different inorganic particles having different mass thermal coefficients of expansion where each layer is essentially unmixed and frozen as layered slurries in a cooling media to form a layered unified casting having interfacial bonds to withstand temperatures of 1,000° C. without delamination, and excellent thermal shock resistance. Molds to cast the materials can be lubricated with mold release agents. Entrapped air is avoided by, for example, vacuum treatment techniques. After freezing, the castings are removed from the mold, thawed, dried and then fired in a kiln. These castings are herein defined as "plural inorganic laminated freeze molded castings". Inorganics that can be used include aluminas, silicas, magnesias, chromites, sponels and clays, and their mixtures, preferably alumina as taught in the above described Blasch-Smith-Johannson patents.

Assembly costs of the existing prior art architectures are high and unacceptable. This is the result of significant custom fitting of major module components during assembly. Again, this is due in part to the difficulties in obtaining precision parts which are machined from insulation board. The shapes of the module must be simple because of this machining, which limits the possibility of making small multi-functional parts. Much of the assembly operations are series in nature and increase the overall assembly time. The series assembly operations can also create lengthy and expensive repair costs if the approach to repair is simply the reverse of the original assembly sequence. If insulation boards are used, disassembly for any reason can result in damage beyond repair.

First, in this invention, there is very little high purity structural board in the integral bundle assembly design and insulation. The load bearing members have been replaced with bottom air inlet plural inorganic laminated freeze molded castings, preferably containing alumina. This affords a more compact efficient and cost effective design. The inherent precision in the molded castings permits parts, such a air inlet manifolds, to assemble directly together without additional labor, resulting in substantial cost savings. Multi-functional parts of uniform quality and low cost are possible.

Very importantly, the SOFC cell is oriented in an "inverted" mode, with the closed end up and open end down. This eliminates the need for the fuel distribution system to support the weight of the stack. This removes considerable insulation board as well any metallic structure required to support the entire stack. With the closed SOFC end up, the weight of the cell rests on cast air inlet manifolds and other components that ultimately form the base of the integral bundle assemblies and assembled module. These cast components are relatively heavy compared to the cells. With the cast components sitting directly on the base of the module, there is no need for either the cells or an additional structure to support these castings, if the cells were oriented with the closed end down. This is an important feature of this architecture because heavy cast ceramic components can be used without the need to load the cells or add structure to support these heavy components.

Figure 5:
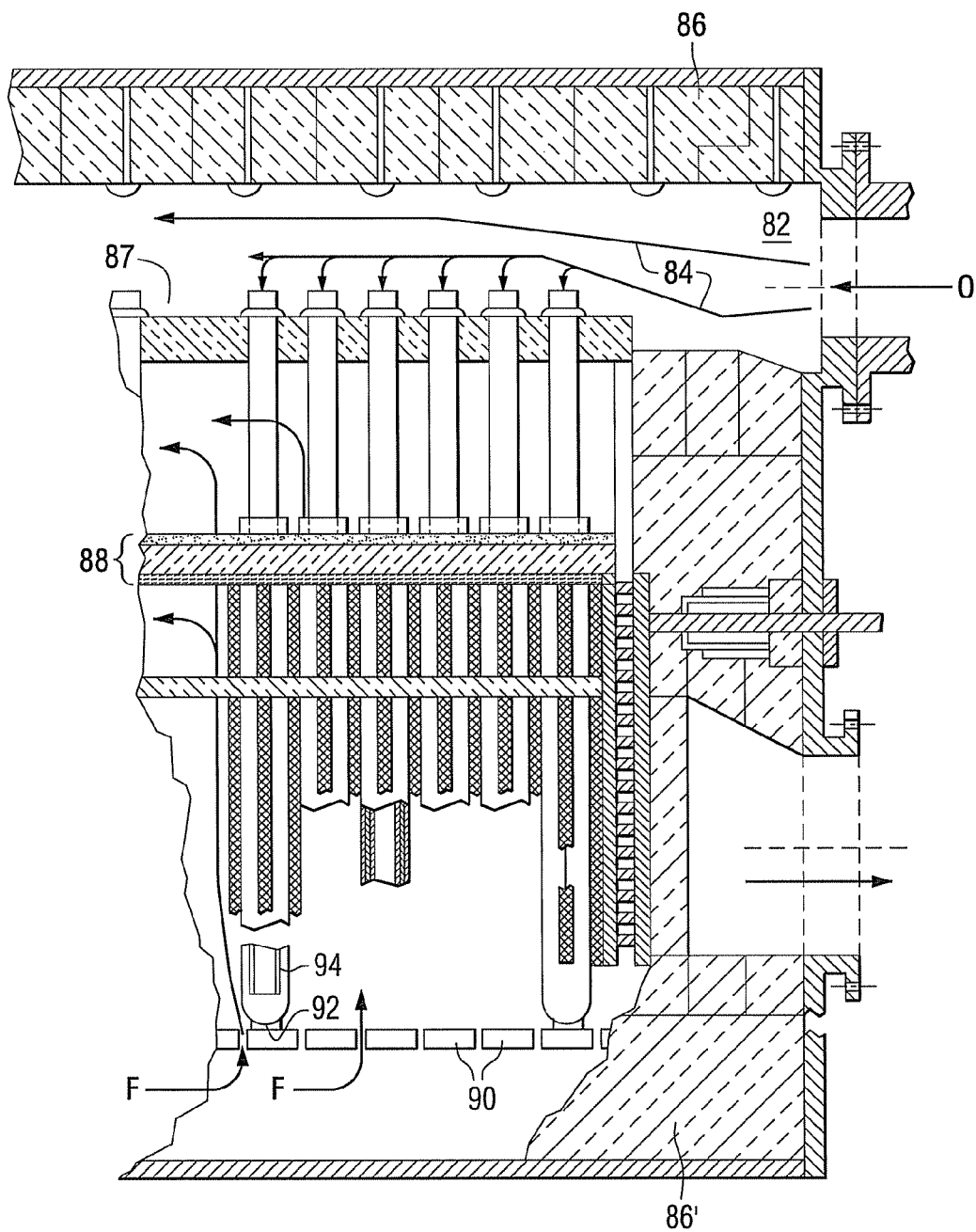
FIG. 5 is a side view section of a standard type prior art SOFC generator with fuel cells in normal closed end down, open end up architecture.
Figure 6:
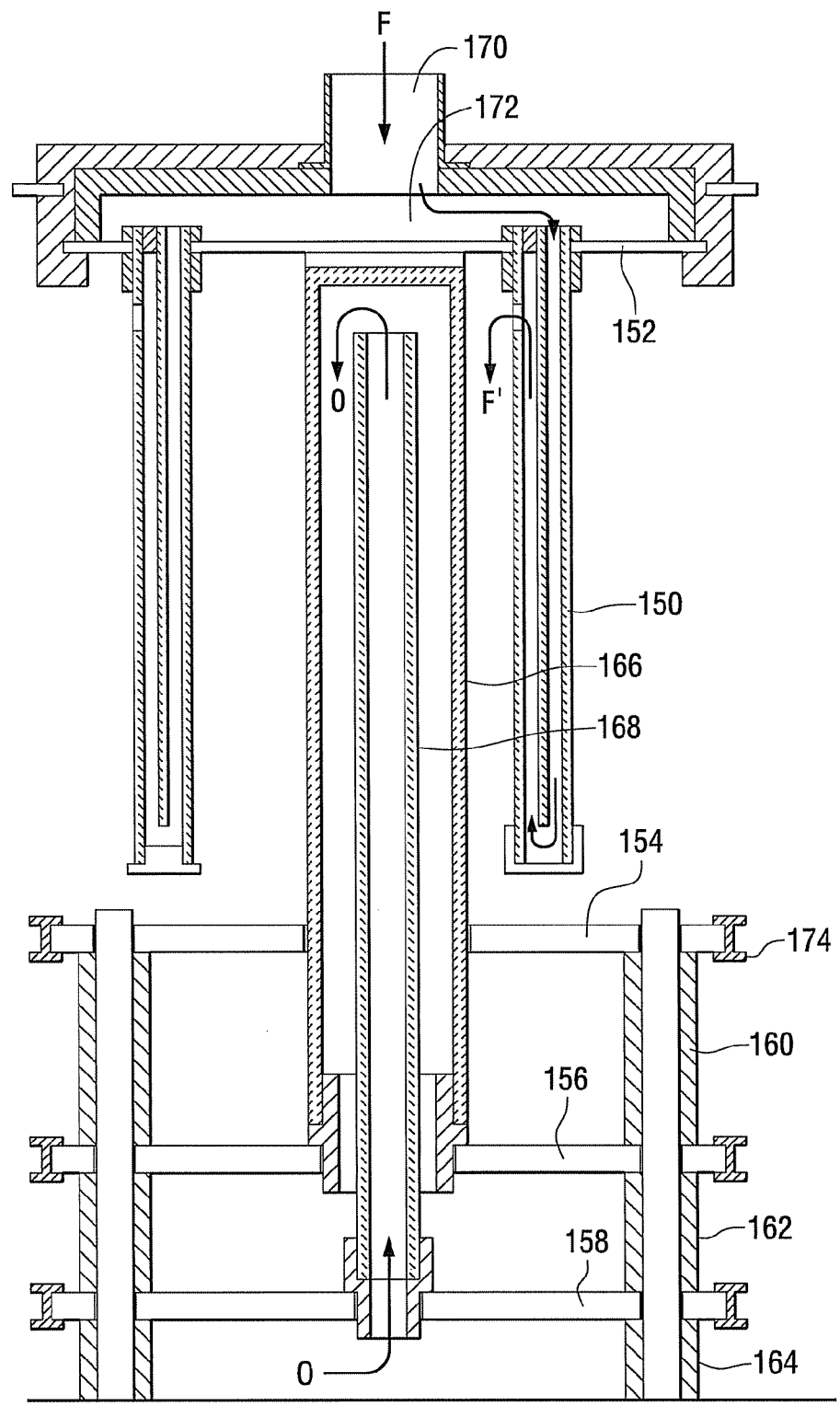
FIG. 6 is a cross-sectional view of a prior art fuel cell generator, using inverted fuel cells, and separate interior fuel reforming means.

This "inverted design" was an issue primarily because substantially all prior generators have had the closed end of the cell in the down position. This was done principally to aid in the assembly of the top positioning boards and seal/positioning gasket over tubular cell bundle rows. It has been assumed, for ease of assembly purposes, that boards could be slid over the open ends of the cells with the cells supported at the base, closed end in the down position. In practice, this past approach for the tubular cell had become more complicated. First, laser mapping of the cells was required for drilling the holes in the positioning boards. The relative axial sliding of the fuel cell tubes to the composite positioning gaskets (88 in FIG. 5) had been problematic. In many cases, the top boards cracked around the peripheral hole region due to axial thermal expansion and the laminate on the boards formed more or less a simple hinge. The introduction of the Delta type geometry made the seal around the open end even more difficult. There is no practical corresponding operation to lasering mapping of the support boards. The seal becomes even more difficult because the magnitude of compensation for mechanical tolerances and thermal expansion in the horizontal plane has greatly increased. This makes an approach to sealing around the cell limited to some type of packing. Extensive sliding of perhaps 0.25 inch axial relative motion is undesirable and would decrease the lifetime of such an arrangement. For large modules it may not be possible to have a uniform seal of desired flow resistance with thermal expansion acting on the seal. It would be preferable to have no axial sliding motion at the seal surface. This can be accomplished by fixing the open end of the cell and allowing the closed end to expand. This reduces the complexity of sealing around an irregular geometry. The cell closed end in the up position creates the opportunity for cost reduction. Here, the fuel plenum distribution region does not support the dead weight of the integral bundle assembly and internal components. This eliminates a substantial amount of structural high purity board found in previous designs. In addition, the cast components, which replace many of the structural board components in previous designs, can be directly supported by themselves to the base of the stack and thus avoiding the cost of providing support for these rather massive components and any potential for applying mechanical loads to the cells. Extremely importantly, in closed end up fuel cells the only weight loads applied to the cells are weight loads generated internally solely by the cells. It has been discovered that this eliminates essentially all mechanical loads of the SOFC.

Figure 7:
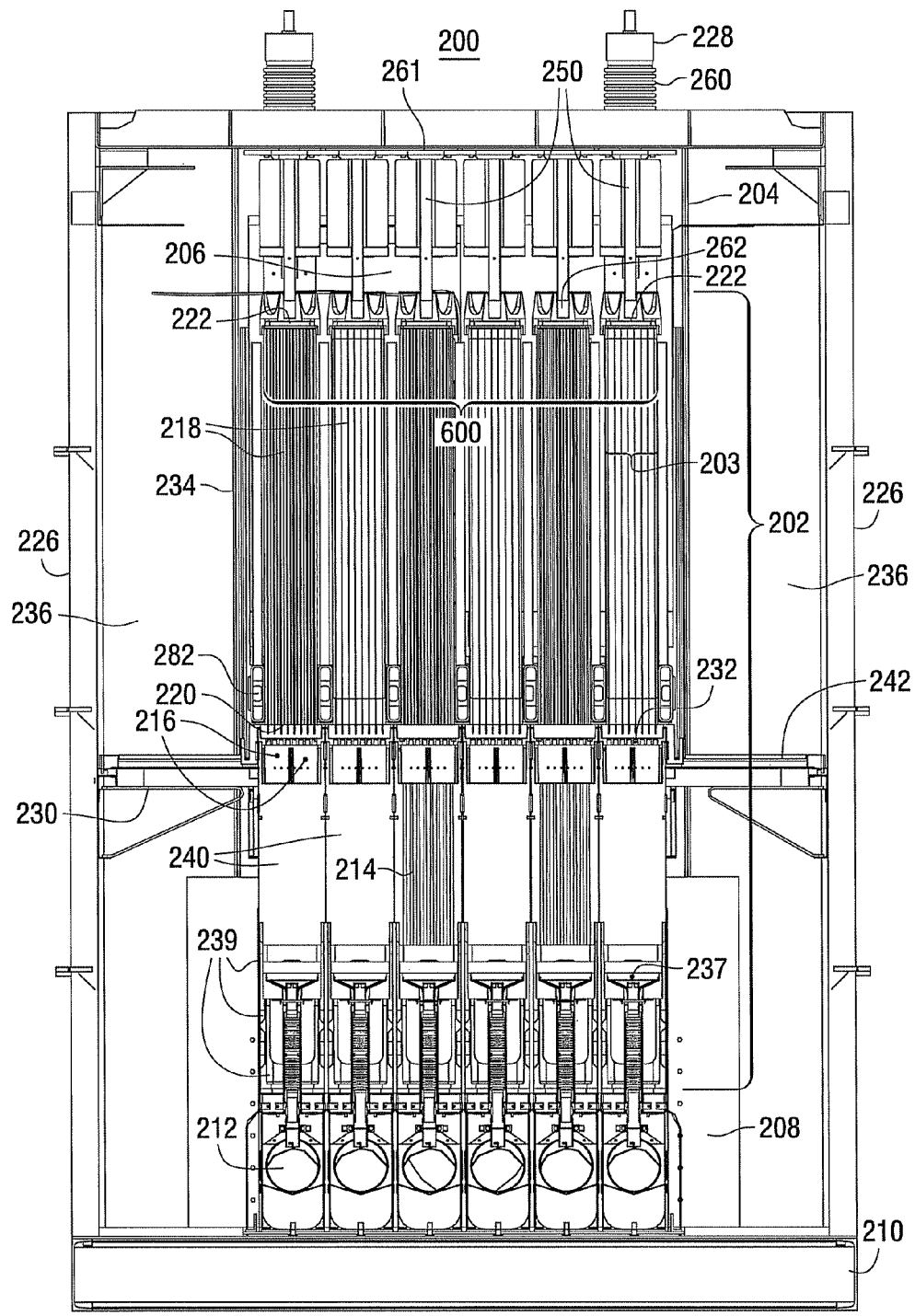
FIG. 7 is an elevational view of the generator architecture surrounding the integral bundle assemblies of this invention showing the "front" air inlet side of the SOFC generator.
Figure 8:
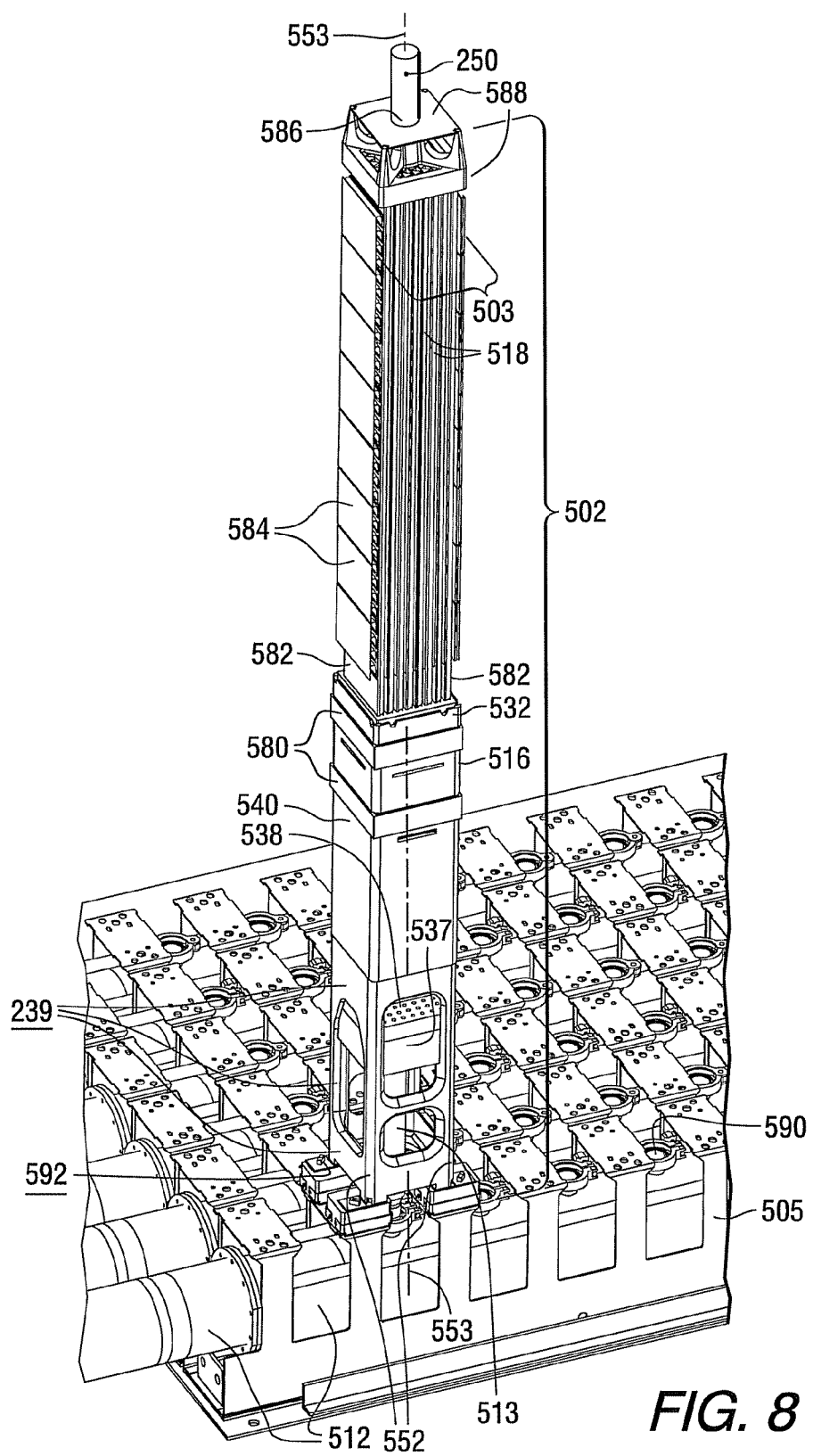
FIG. 8, which best illustrates the invention, is an isometric view of one SOFC integral bundle assembly and module base air inlet manifolds.
Figure 9:
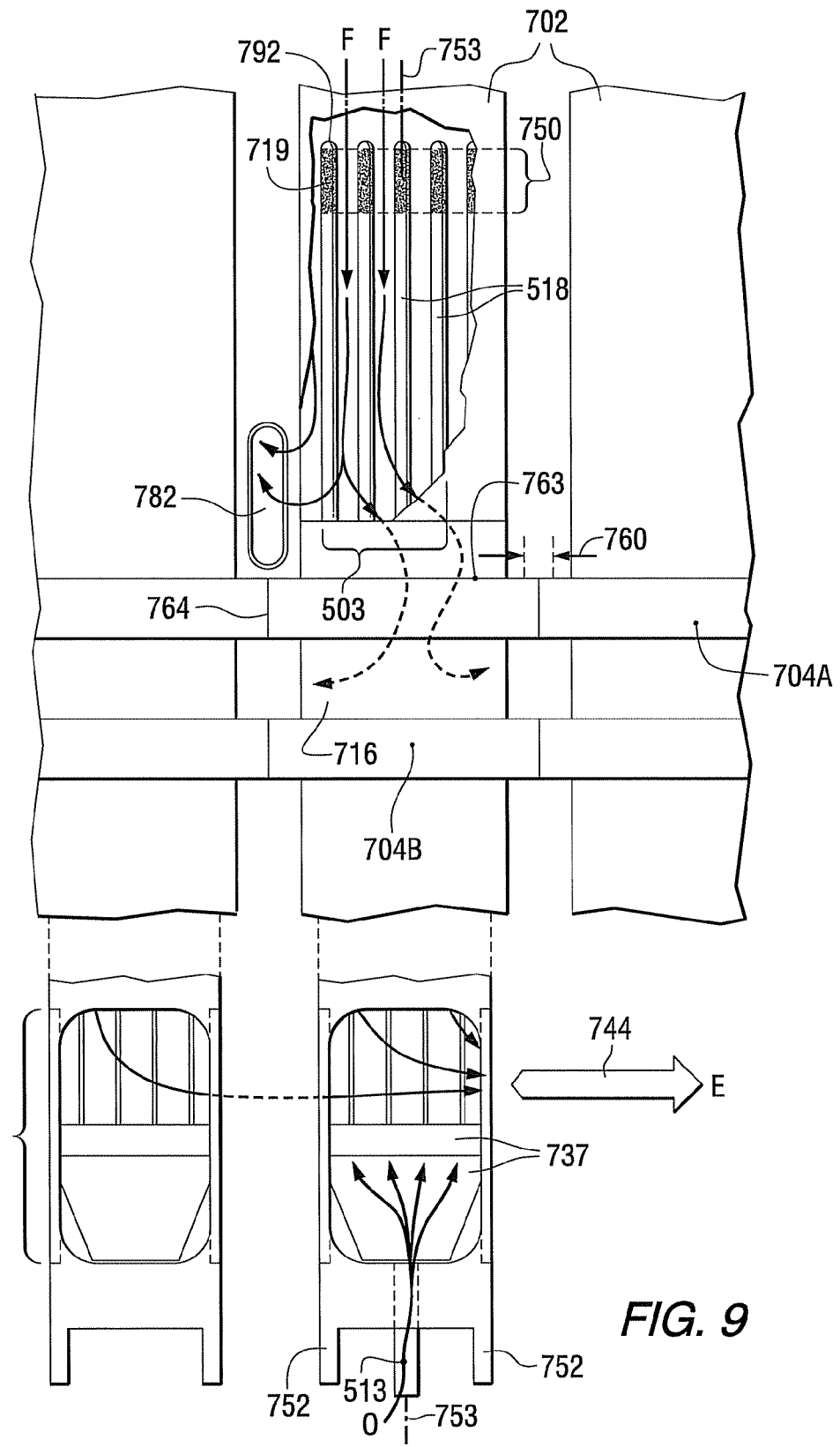
FIG. 9, is a detailed cross-sectional view of the soft, fibrous band seals used as a cushion between module assemblies as well as the inverted fuel cells, air box, ceramic base legs and vertical thermal expansion center.

Additionally, there is a single integral solid oxide fuel cell stack bundle assembly 202, 502 and 702 in FIGS. 7, 8 and 9, respectively that is the fundamental element that forms an overall combined module. The integral fuel cell stack bundle assembly provides basic services for each group of hollow, tubular inverted solid oxide fuel cells, 218 and 518 in FIGS. 7, 8 and 9, within the integral bundle assembly. This invention provides individual thermal centers for the mounting of each integral bundle assembly to control vertical and horizontal thermal expansion. This approach is scalable to large modules because the thermal expansion is controlled at the single bundle level. Therefore, the fundamental element can be tested and the extrapolation to a larger module is significantly easier. Relative horizontal thermal expansion motion between the stack and surrounding container is greatly reduced, by utilizing circumferential, soft fiber pads/compliant gaskets, usually two, 580 in FIG. 8 and 704A and 704B in FIG. 9, which significantly simplifies lateral support of the array of integral bundle assemblies and control of fuel bypass. In the design of the module, the individual integral bundle assemblies are assembled onto fixtures, that are part of the metallic base, that are actually parts of the final module assembly. This eliminates considerable amounts of labor previously required to set up and remove fixturing during module assembly.

Referring now to the invention in more detail and its relationship to its environment with other integral module assemblies. FIG. 7 shows a solid oxide fuel cell generator 200 comprising a top portion 204 containing a top inlet fuel plenum 206 and a bottom portion 208 containing a metallic base support 210. Air inlet manifolds are shown as 212. The air inlet manifolds 212, usually metallic, are below and communicate with an array of air boxes 237 which also communicate with air feed tubes 214 which pass through a combustion zone 216, said air feed tubes passing into the center of tubular, elongated, hollow electrically connected solid oxide fuel cells 218. The fuel cells 218 are tubular, elongated, hollow solid oxide fuel cells as defined previously and are grouped into bundles, shown, for example, as 203. The entire length of fuel cells, air feed tubes combustion zones are defined as integral bundle assembly 202. The fuel cells 218 have an open end generally shown as 220 above the combustion zone 216 into which the air feed tubes 214 pass, and a closed end generally shown as 222 near the inlet fuel plenum 206, said fuel cells comprising a plurality of fuel cell stack bundles 203, best seen in FIG. 8 as 503, all surrounded within an outer metallic generator enclosure 226. Top power leads 228, which can have bellows structure 260 are located in a reducing fuel atmosphere, provide electrical output from the stack bundles 203, where the fuel cells operate in the fuel cell mode and where the container metallic base support 210 and bottom cast ceramic air exhaust manifolds 239, carry at least 85% of the weight of the integral bundle assemblies 202 and 502. As described previously in detail, the cast ceramic air exhaust manifolds 239 and recuperators 240 and 540 are, preferably, plural inorganic laminated freeze molded castings 90 vol. % to 98 vol. % dense having interfacial bonds able to withstand temperatures of 1,000° C.

Also shown in FIG. 7 are lateral supports 230, open end fuel cell seals 232, stack liner 234, fuel barrier 242, air boxes 237, spent fuel channel 282 and minimal loose blanket insulation 236, which needs no machining. Due to individual thermal centers, relative movement between stack and peripheral insulation is reduced for large stacks simplifying peripheral insulation design and minimizing fuel by-pass of the stack. This vertical thermal expansion center has at its top a sliding metallic pin, bellows arrangement or enclosed spring/pin etc. 250, preferably attached to the top 261 of the enclosure where the pins can slide in slide space 262. These are best seen also as 250 in FIG. 8, and at its bottom ceramic exhaust manifold base legs, best seen in FIG. 8 as 552 and FIG. 9 as 752 for each integral bundle assembly, providing a bundle vertical thermal expansion center for the fuel cells. As can be seen in FIG. 7, the interior of the generator enclosure 226 contains primarily electrically generating components, no separate internal reformers, ejectors or the like. A single row of bundle assemblies is shown as 600.

FIG. 8 shows the inventive basic integral bundle assembly 502 (202 in FIG. 7). This bundle assembly 502 first of all stands on and is supported by cast ceramic air exhaust manifold structures 239 which end on cast ceramic manifold base legs (usually four legs) 552 which have bottom "keyways" 592 which together with the cast ceramic base legs 552 sit on a top metallic base 505 and establish a bottom thermal center axis for expansion shown as axis line 553; through hole 586 in top plate 588 for a sliding thermal expansion pin 250 also shown in FIG. 7. The air manifolds 512 are shown leading to individual integral bundle assembly air inlets 513, passing from air manifold outlets 590, leading to metal or ceramic air box 537. Air feed tube holes 538 are shown for air feed tubes which proceed into the individual fuel cells.

Importantly, each air exhaust manifold structure has assembly air inlets and interconnected cast ceramic air exhaust manifold structures 239 which all link/connect with adjacent structures to form a module air exhaust best shown in FIG. 9. Similarly, flexible, compliant wrap-around gaskets 580 are disposed between adjacent integral bundle assemblies on all four sides of the integral bundle assembly, not only just between assemblies in a bundle. These compliant, wrap-around gaskets 580 in FIG. 8 are preferably disposed at two locations on either side of a "combustion zone" 516, where depleted fuel reacts with depleted oxidant to help heat oxidant passing in oxidant feed tubes in "recuperator" zone 540. The gaskets 580 are very soft, spongy fibrous insulation, very compressible and providing relief from horizontal thermal expansion. Also shown are electrical connectors 584 which connect to a power lead and spent fuel recirculation channel 582. The spent fuel recirculation channel, also, 782 FIG. 9 collects the spent fuel from each integral bundle assembly along the array. Open end fuel cell seals 532 FIG. 8 seal the open end of the inverted fuel cells 518 in bundle 503.

It is important to note that with the arrangement shown in FIG. 7, very little high temperature structure excluding the fuel cells is located above the fuel barrier 242 elevation. Essentially all the dead weight load of fuel cells is supported by the air exhaust castings 239 located below the fuel barrier 242. Prior art designs required substantial high temperature structure where the cells were in the open end up position.

This new inventive design is a major simplification and cost advantage and eliminates axial sliding at the open end seal of the fuel cell. Prior art arrangement always had a sliding seal 88 at the open end of the cell as shown, for example, in FIG. 5. For complex cell geometry horizontal profiles, eliminating this axial sliding seal is a major advantage.

Air is introduced into the module and sent to a series of metallic manifolds 512 in FIG. 8 to feed the individual air boxes 537 of the integral bundle assemblies 502 through air feeds 513. With this arrangement, the air manifolds are in close proximity to the floor of the container and provide some thermal protection of the floor from the exhaust plenum heat. In addition, this places components that are least sensitive to moisture in the bottom of the unit if condensation should occur. Each integral bundle assembly 502 taps into the air manifolds and further distributes the air to each integral bundle assembly. The incoming air pressure is above the surrounding air exhaust pressure, so this necessitates providing seals at the point of tapping into the main air manifold by the integral bundle assembly.

An essential aspect of the invention is the modular approach used, and how this provides synergy for accommodating thermal expansion. Each integral bundle assembly is assembled with other integral bundle assemblies to form a module row. The base of this row forms the fixture for assembly of the row. The fuel cell bundles are electrically connected in series along the row. The rows are ultimately electrically connected in series to form a larger stack. The power is then removed from the module, for example, with two power leads. Contained in the base is a single air manifold 512 that feeds the single row of integral bundle assemblies. Each integral bundle assembly has ceramic legs 552 that mate with the base of the row. These legs are oriented such that each integral bundle assembly has its own thermal center, 553 in FIG. 8, in vertical axis located in the center of each integral bundle assembly. The base essentially remains at ambient temperature and is mounted along with other bases to form a larger stack.

As seen in FIG. 8, the center of each integral bundle assembly 502 does not move due to thermal expansion in the horizontal plane relative to the outside of the container. This greatly simplifies interfacing with the stack for either mechanical support, controlling fuel by pass in the peripheral insulation, and power lead design. The thermal expansion is accommodated between the integral bundle assemblies with compliant wrap-around gaskets 580 between the integral bundle assemblies, the gaskets located below the open end seal (532 in FIG. 8). The bundle is sized such that the closure of the space between the integral bundle assemblies can be accommodated with the fibrous type compliant gaskets 580. Likewise, compliance is provided in the electrical connections between integral bundle assemblies.

This novel approach to module architecture never allows thermal expansion to accumulate beyond that of a single bundle regardless of the size of the array of integral bundle assemblies used to form a module for power generation. This facilitates the assembly of module power modules of increasing size with little additional consideration for thermal expansion due to the larger size. At the closed end of the integral bundle assembly, pins 250 in FIG. 8 extend down from the top of the container, one for each integral bundle assembly (only one shown), and are aligned with the thermal center 553 at the base of the respective integral bundle assembly. These pins 250 are free to slide in the vertical direction within the top plate holes, 586 of the fixtures that capture the close end of the bundles. This is how vertical thermal expansion is accommodated for each integral bundle assembly.

The method of controlling thermal expansion greatly simplifies the lateral support of the stack and the installation of the peripheral insulation. Because the thermal expansion in the horizontal plane is very small, the lateral support of the stack can simply run structurally from the side of the container to the peripheral integral bundle assemblies. Any thermal expansion in the horizontal plane can be easily accommodated by additional gasket 580 in compression. The peripheral insulation can simply be loose fill without the need to be able to significantly compress to accommodate thermal expansion. Prior art required special features to accommodate much larger thermal expansions. The size of the power unit using prior art would become practically limited due to dealing with ever increasing thermal expansion in the horizontal plane of larger internal stacks.

FIG. 9 illustrates the fibrous compliant wrap-around band seal gaskets 704A and 704B, (580 in FIG. 8), which separate the integral bundle assemblies 702 a distance, which distance is exaggerated in FIG. 9 for the sake of simplicity. The legs 752 of the bottom ceramic casting are also shown as well as air box 737, with feed 513 from the main air plenum. As shown, inverted fuel cells 518 have fuel passing directly into the fuel cell bundles 503, importantly, without any discrete, separate fuel reforming tubes, etc. between fuel cells which can take up 15 vol. % to 30 vol. % space within the fuel cell area. The hydrocarbon fuel F, may be directly reformed into simpler constituents such as hydrogen and carbon monoxide on reforming retardant coated 719 portions 750 of the fuel cell surface. As also can be seen, fuel F passes unrestricted outside the SOFC's 518 and continues down, as spent fuel ultimately being completely burned in the combustion zone, and out as exhaust flow E, 744. Thermal expansion 760 in the horizontal direction will cause compression forces on seal gaskets 704A and 704B to maintain separation of each bundle assembly at operating temperature and maintain separation between the fuel rich zone and the exhaust. Air box is shown as 737, vertical thermal center axis as is also shown as 753 (553 in FIG. 8) and fuel cells closed end at 792. At point 763 some spent fuel is recirculated into channel 782 with the remainder passed into combustion zone 716. At location 764 any expansion is accommodated by gasket 704A.

Figure 10A:
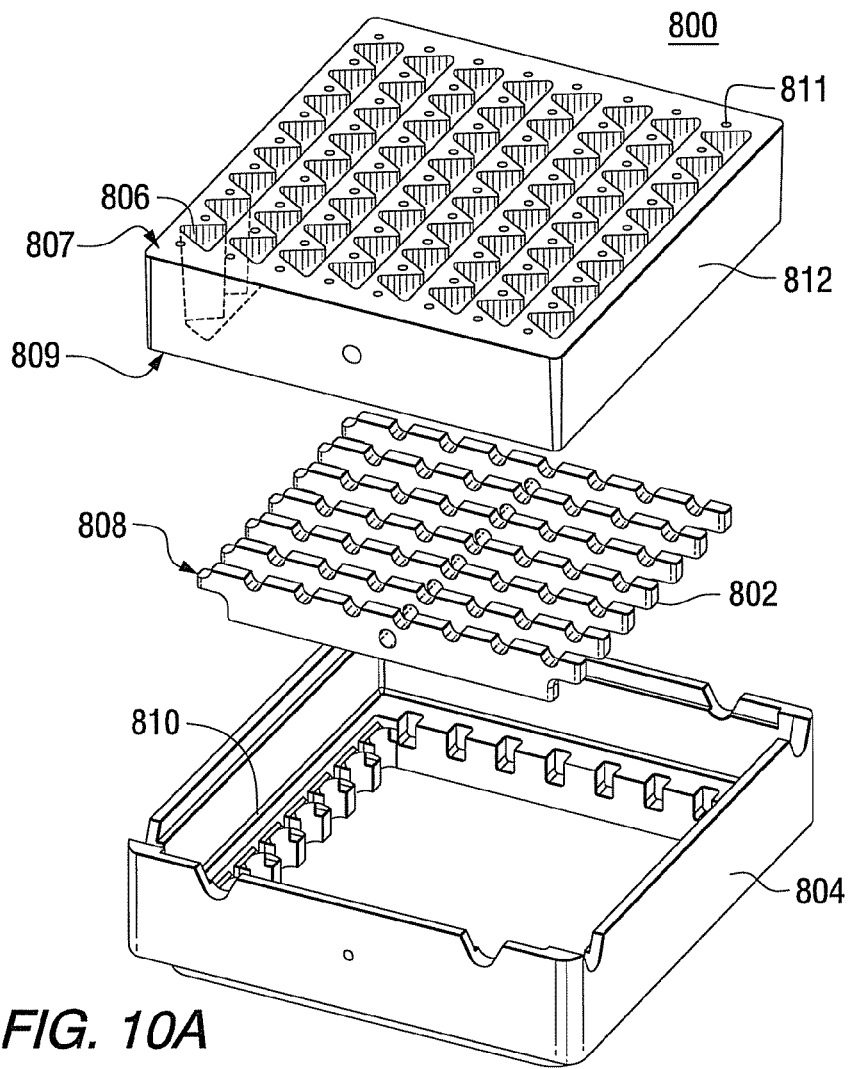
FIG. 10A is an exploded view of an open end fuel cell seal system with the seal, bundle support beams and support casting.
Figure 10B:
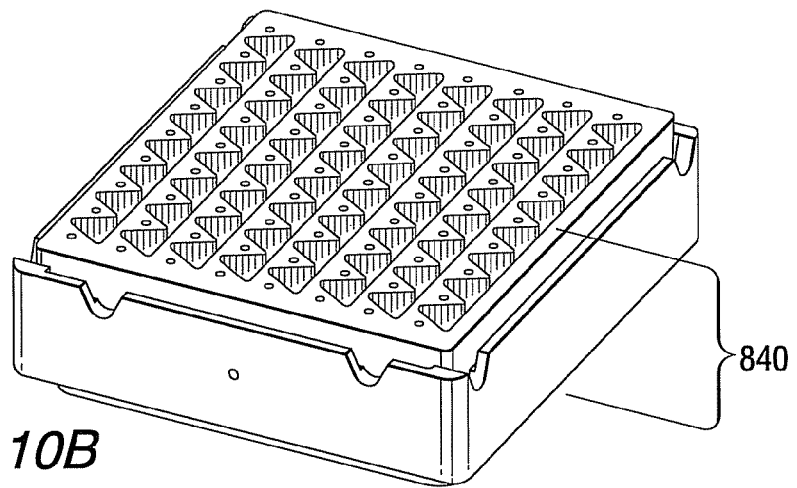
FIG. 10B is a three dimensional view of the consolidated seal system of FIG. 10A.

The open end seal system 800, shown here for Delta-8 integral bundle assembly, which of course can be used for other "tubular elongated hollow" solid oxide open end systems, is shown in FIGS. 10A-B and 11A-B, consists of a combination of 1) compliant ceramic seal 812, 2) support casting 804, and 3) a plurality of bundle support beams 802 as shown in exploded view of FIG. 10A. The complete consolidated assembly is also shown in FIG. 10B (top view) and FIG. 11B (bottom view).

Figure 11A:
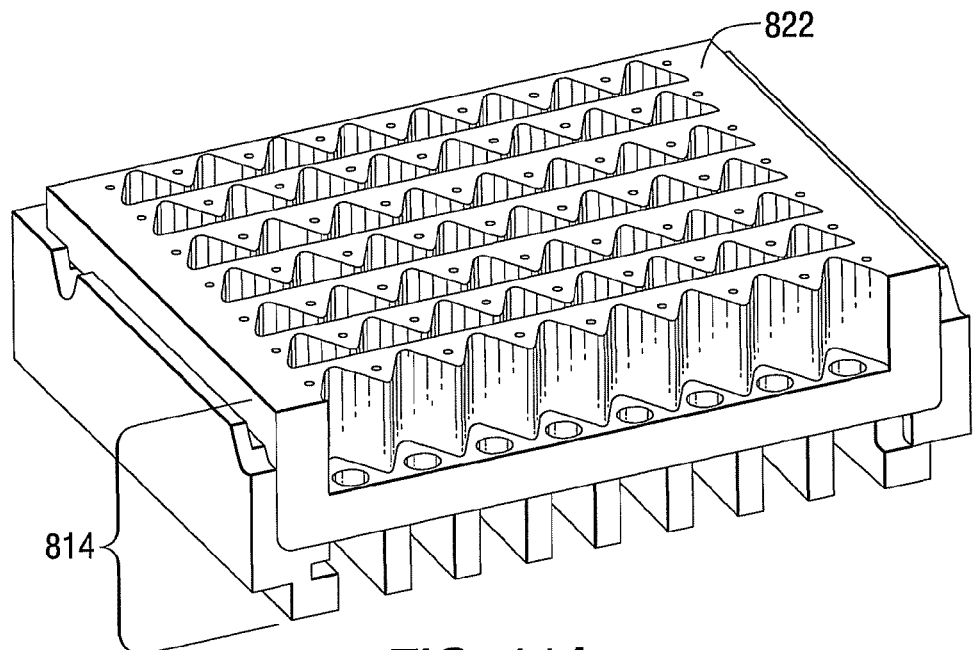
FIG. 11A is a three dimensional sectioned view of the consolidated seal system.
Figure 11B:
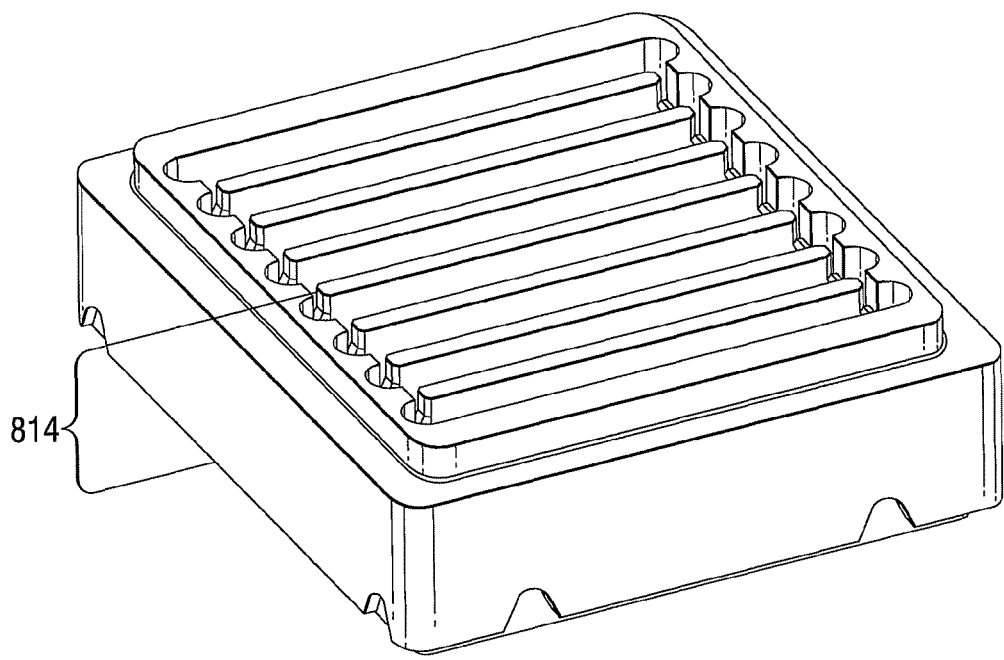
FIG. 11B is a three dimensional bottom view of the consolidated seal system.

FIGS. 11A and 11B are added simply to show the assembled seal from several new points. The open end seal, as shown generally in FIG. 11A as 822 is a thick ceramic board, made of high purity fibrous alumina compressed to a sufficient density and sintered at 1,200° C. to provide adequate flow impedance and mechanical support of the integral bundle assembly. The board is laminated with high purity ceramic woven fabric to reinforce the whole structure and to reduce permeability and flow diffusion through the seal. Soft fibrous board is also externally laminated as a reinforcement. The complete assembly is shown as 814 in FIGS. 11A and 11B and 840 in FIG. 10B.

The final shape is a thick board custom machined, as shown in FIG. 10A, with deep sockets or pockets 806 to accommodate the open ends of a Delta-8 bundle This shape can be produced by vacuum forming of high purity alumina fibrous board. Lamination is typically done using high purity alumina woven fabric, and low phosphorus alumina cements, as a bonding agent. This forms a composite structure for the seal. Custom machining of the final shape is accomplished by using actual cell profile data acquired through a laser scanning technique.

Laser scanning is a fast, non-contact process which provides point clouds for accurate mapping of complex profiles such as Delta 8 profiles. It is ideal for fragile SOFC bundles that could be damaged or cracked by a conventional touch-trigger contact probe.

To obtain the actual open end cell profile, such as shown in FIG. 10A, a Delta-8 cell bundle is laser scanned at the cell open end location. Specialized metrology software programs reduce the raw data into a machining tool path.

The key design requirement is that the compliant seal 812 in FIG. 10A must perfectly match the wavy profile of the cells as shown as pockets or openings 806 without a gap. At high temperature, because of the differential thermal expansion between cell and seal, the cell fully expands against the side wall of the seal 812, thus providing total closure of the peripheral gaps. Furthermore, because each wavy side wall profile of the seal have a slight downward tapered angle, approximately 1 degree included from surface 807 to surface 809, as generally shown, the cell becomes tightly engaged within the socket by its own dead weight. The tapered surface also facilitates assembly of the seal over the bundle. Thus, the profile tapers from top 807 to bottom 809 to a depth of as much as 0.25 inch to 1.0 inch (0.6 cm to 2.54 cm).

The open end seal support casting 804 provides support and containment of the open end seal. The center portion of the casting is totally open to prevent buildup of severe stresses as a result of steep thermal gradients within the ceramic structure which may cause deformation or ultimately, catastrophic failure of the component. A number of support beams 802 are incorporated in the casting to provide additional support of the seal and bundle assembly. Flow holes 811, end supports 808 of the beams 802, pilot portions 810 for support beams 802 are also shown.

Reiterating, going back to FIG. 8, from top to bottom, the integral bundle assembly 502 contains 1) closed end at fuel plenum with slidable, adjustable positioning pin 250; 2) fuel cell bundles 503—the active part of the stack assembly; 3) spent fuel recirculation channel 582; 4) open end cell seal assembly 532; 5) top wrap around gasket 580; 6) combustion zone 516; 7) bottom wrap around gasket 580; 8) base support, ceramic exhaust manifold 239 containing metal or ceramic air box 537; and 9) cast ceramic base legs 552, which along with the slidable pin 250 provide an axis line 553 which accommodates vertical thermal expansion. In the integral bundle assembly 502, the base support exhaust manifold 239 supports the entire weight of the integral bundle assembly, and forms the exhaust passage in the integral bundle assembly, and provides support for the air box. The air box provides air distribution to the fuel cells by supporting and sealing to individual air feed tubes. The bottom of the exhaust casting has a set of legs and keyways to form the thermal center of the integral bundle assembly in the vertical axis. The recuperator casting sits directly on top of the exhaust casting. The recuperator casting 540 provides the exhaust passages for the counter flow heat exchanger which preheats the air delivered into the fuel cell bundle. The top portion of the recuperator casting has an integral cavity that forms the combustion zone 516 to combust the spent fuel from the fuel cells. The sides of the recuperator have provisions for seals 580 on the sides which are used to seal between integral bundle assemblies when an array of integral bundle assembly's forms a larger module. The open end seal casting pilots into the end of the recuperator casting. The open end seal casting supports the seal around the fuel cell bundle. The integral bundle assembly concept could be used for other cell geometries including tubular.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An integral bundle assembly comprising: a top inlet fuel portion; an inlet fuel stream near the top portion; inverted, tubular, elongated, hollow, electrically connected solid oxide fuel cells disposed below the top portion, the fuel cells set to operate in the fuel cell mode; internal heat recuperator disposed below the fuel cells; an open end fuel cell seal between a combustion zone and fuel cells; two cushion ceramic band seal layers between the open end fuel cell seal and the recuperator which cushion band seal layers control horizontal thermal expansion between integral bundle assemblies; a bottom portion of dense ceramic casting having a plurality of bottom legs formed as a ceramic exhaust manifold supporting the recuperator and fuel cells; and inlet air feed tubes feeding to the fuel cells, the air feed tubes connecting with a bottom oxidant feed, where the open end fuel cell seal comprises a ceramic seal that conforms to the open ends of the fuel cells which fuel cells rest upon separate fuel cell bundle support beams.

2. The integral bundle assembly of claim 1, wherein a sliding pin is disposed in the inlet fuel top portion, and, along with the plurality of bottom legs of the bottom portion ceramic casting provide a vertical integral bundle assembly thermal expansion center and where the bottom portion of dense ceramic casting carries all of the internal weight of the integral bundle assembly.

3. The integral bundle assembly of claim 2, wherein the sliding pin is metallic.

4. The integral bundle assembly of claim 1, wherein both the ceramic seal and support beam are disposed in a separate support casting, all above a combustion zone, a recuperator, and at least one cushion ceramic band seal that accommodates thermal expansion.

5. A plurality of integral bundle assemblies each comprising: a top inlet fuel portion including a top plate and a top vertical metallic sliding pin which is slidable within the top plate of the assemblies, to accommodate assembly axial thermal expansion and a bottom portion receiving air inlet feed, which is made of dense, molded casting formed as a ceramic air exhaust manifold part which air exhaust manifold part is below and provides a receptacle for an air inlet box and inlet air feed tubes, the exhaust manifold located below an internal heat recuperator, said air feed tubes passing into the center of inverted, tubular, elongated, hollow electrically connected solid oxide fuel cells having an open end above the internal heat recuperator, through which the air feed tubes pass and a closed end near the inlet fuel portion, said fuel cells comprising a fuel cell stack bundle, where the fuel cells operate in the fuel cell mode and where the bottom ceramic air exhaust manifolds carry at least 85% of the internal weight of the integral bundle assembly, and ceramic exhaust manifold bottom four point ceramic legs (keyways) provide a central axis with the top sliding metallic pin to provide a vertical integral bundle assembly thermal expansion center, where each integral bundle assembly is separated from adjacent bundle assemblies by at least one flexible, circumferentially disposed, cushion ceramic band seal layer located between the recuperator and the fuel cells, and where a ceramic seal conforms to the open end of the fuel cells which rest upon a separate fuel cell bundle support beam, the combination seal and support beam disposed in a separate ceramic support casting, all disposed above the cushion ceramic band seal layer; and where the interior of the integral bundle assemblies contain primarily electrically generating components.

6. The integral bundle assembly of claim 5, wherein the dense ceramic air exhaust manifolds are plural, inorganic, laminated freeze molded castings.

7. The integral bundle assembly of claim 6, wherein the dense ceramic air exhaust manifold castings have interfacial bonds among plural inorganics used which withstand temperatures of 1,000° C. without delamination, and are 90 vol. % to 98 vol. % dense.

8. The integral bundle assembly of claim 5, wherein the dense ceramic air exhaust manifold castings are made from inorganic materials selected from the group consisting of aluminas, silicas, magnesias, chromites, spinels, clays and mixtures thereof.

9. The integral bundle assembly of claim 5, wherein the dense ceramic air exhaust manifold castings are made from alumina.

10. The integral bundle assembly of claim 5, wherein the solid oxide fuel cells are tubular.

11. The integral bundle assembly of claim 5, wherein the solid oxide fuel cells are of delta configuration.

12. The integral bundle assembly of claim 5, where the bottom ceramic air exhaust manifolds are mounted on a metallic base support.

13. The integral bundle assembly of claim 5, where the at least one flexible band seal layer accommodates horizontal thermal expansion between integral bundle assemblies.

14. The integral bundle assembly of claim 5, wherein a portion of the exterior of the fuel cells that fuel contacts, contain reforming coating, to reform hydrocarbon fuel in-situ on the fuel cell.

15. The integral bundle assembly of claim 5, wherein the only weight loads applied to the solid oxide fuel cells' are weight loads generated internally solely by the fuel cells' own weight.

16. The integral bundle assembly of claim 5, wherein the air inlet feed tubes which pass through a recuperator communicate with an air box below the solid oxide fuel cells and the air box is connected to bottom air inlet manifolds.

17. The integral bundle assembly of claim 5, wherein the solid oxide fuel cells have an open end above a combustion zone, which combustion zone is above a recuperator, and have a closed end near the inlet fuel plenum, and where the ceramic seal openings accommodate the fuel cell open ends are tapered to ensure a tight fit between the seal and the fuel cells.

18. The integral bundle assembly of claim 5, wherein a ceramic support casting supports a plurality of bundle support beams within it as well as a top compliant ceramic seal.

* * * * *